US008798154B2

(12) United States Patent
Minato

(10) Patent No.: US 8,798,154 B2
(45) Date of Patent: Aug. 5, 2014

(54) FRAME RATE CONVERSION APPARATUS AND CONTROL METHOD THEREOF

(75) Inventor: Yoshihiko Minato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 530 days.

(21) Appl. No.: 12/793,816

(22) Filed: Jun. 4, 2010

(65) Prior Publication Data

US 2010/0316128 A1 Dec. 16, 2010

(30) Foreign Application Priority Data

Jun. 11, 2009 (JP) .................................. 2009-139902
Mar. 10, 2010 (JP) .................................. 2010-053641

(51) Int. Cl.
*H04N 7/12* (2006.01)
*H04N 7/01* (2006.01)

(52) U.S. Cl.
CPC .................................. *H04N 7/013* (2013.01); *H04N 7/014* (2013.01)
USPC .................................................... 375/240.16

(58) Field of Classification Search
CPC .............................. H04N 7/013; H04N 7/014
USPC ........................................ 375/240.01–240.29
See application file for complete search history.

(56) References Cited

U.S. PATENT DOCUMENTS

| 2008/0028431 | A1* | 1/2008 | Park ............................... 725/90 |
| 2008/0084501 | A1* | 4/2008 | Miyauchi et al. ............. 348/452 |
| 2008/0159395 | A1 | 7/2008 | Terada |
| 2008/0181312 | A1 | 7/2008 | Kimura |
| 2008/0226197 | A1 | 9/2008 | Saga |
| 2008/0240562 | A1 | 10/2008 | Fukuda et al. |
| 2009/0059068 | A1* | 3/2009 | Hanaoka et al. ............. 348/459 |
| 2009/0059074 | A1 | 3/2009 | Suematsu et al. |

FOREIGN PATENT DOCUMENTS

| JP | 2008-160591 A | 7/2008 |
| JP | 2008-166969 A | 7/2008 |
| JP | 2008-228233 A | 9/2008 |
| JP | 2008-244687 A | 10/2008 |
| JP | 2009-060371 A | 3/2009 |

* cited by examiner

*Primary Examiner* — Richard Torrente
(74) *Attorney, Agent, or Firm* — Fitzpatrick, Cella, Harper & Scinto

(57) ABSTRACT

The frame rate conversion apparatus of the present invention has: a detection unit that generates motion information by detecting motion of picture at each pixel location from a moving image which is not synthesized with a still image; a synthesizing unit that generates a synthesized moving image by synthesizing a still image on a blending region in the moving image at a prescribed opacity; a judgment unit that determines whether or not a pixel of interest of an interpolation frame to be inserted between frames of the synthesized moving image is a pixel within the blending region; and a generation unit that generates the interpolation frame by determining a value of the pixel of interest corresponding to a determination result.

4 Claims, 11 Drawing Sheets

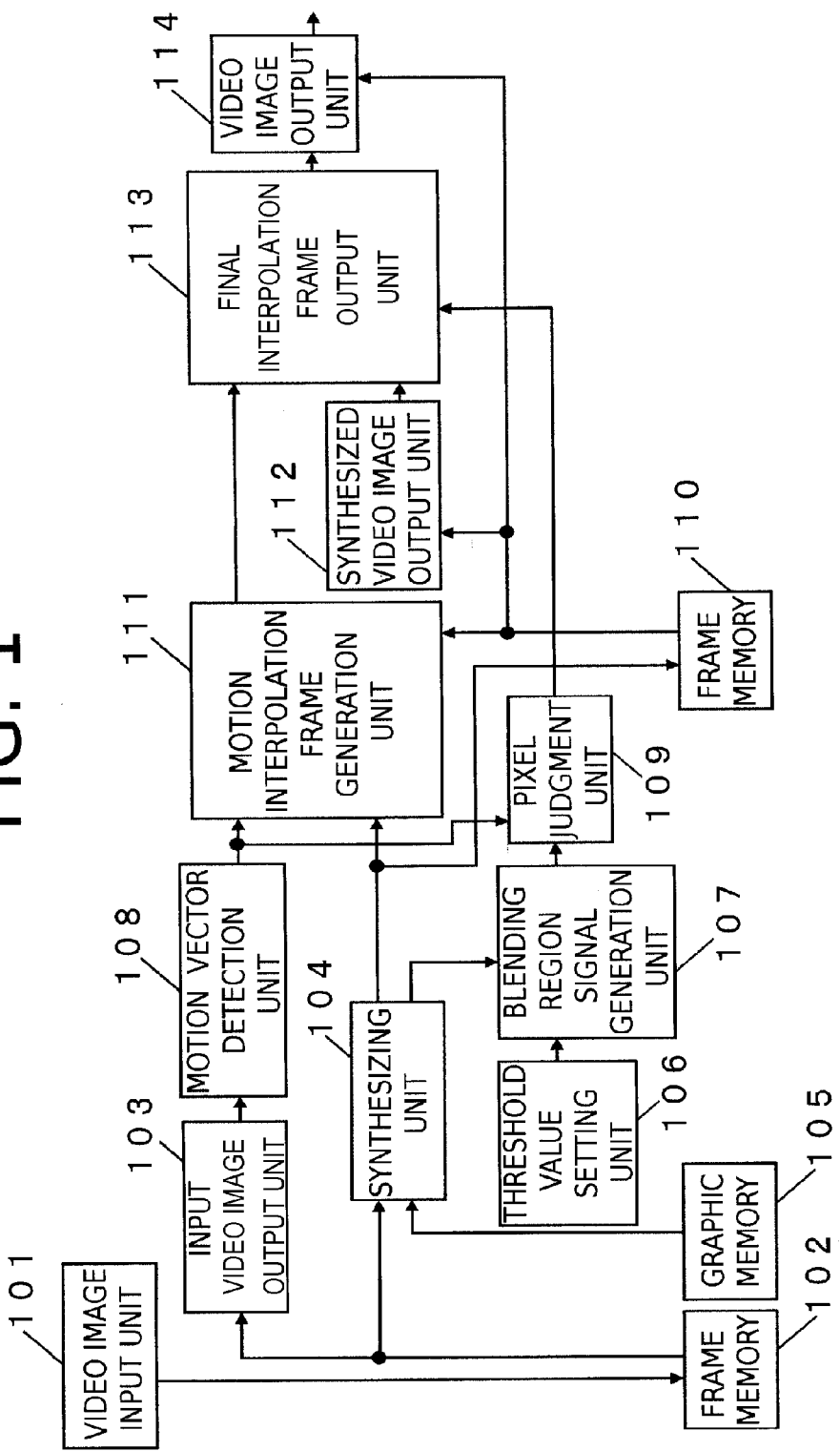

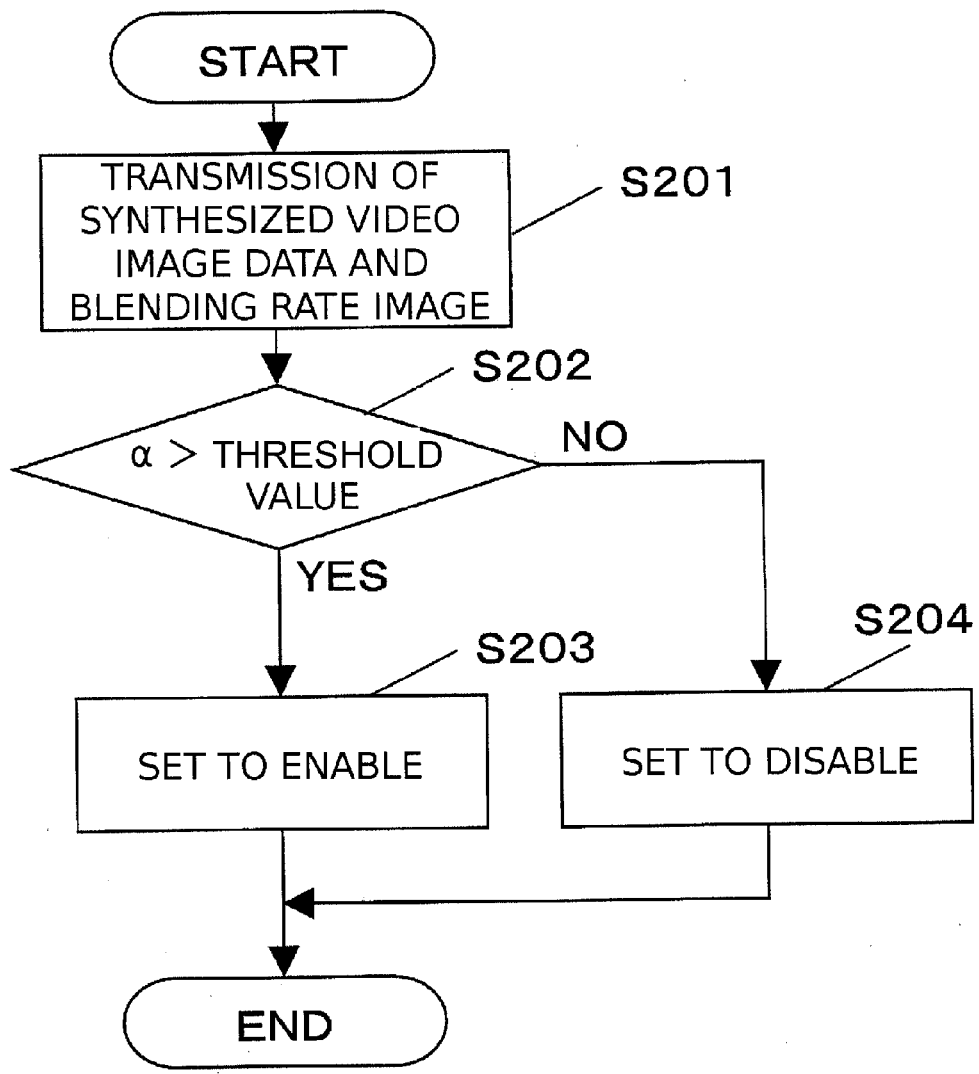

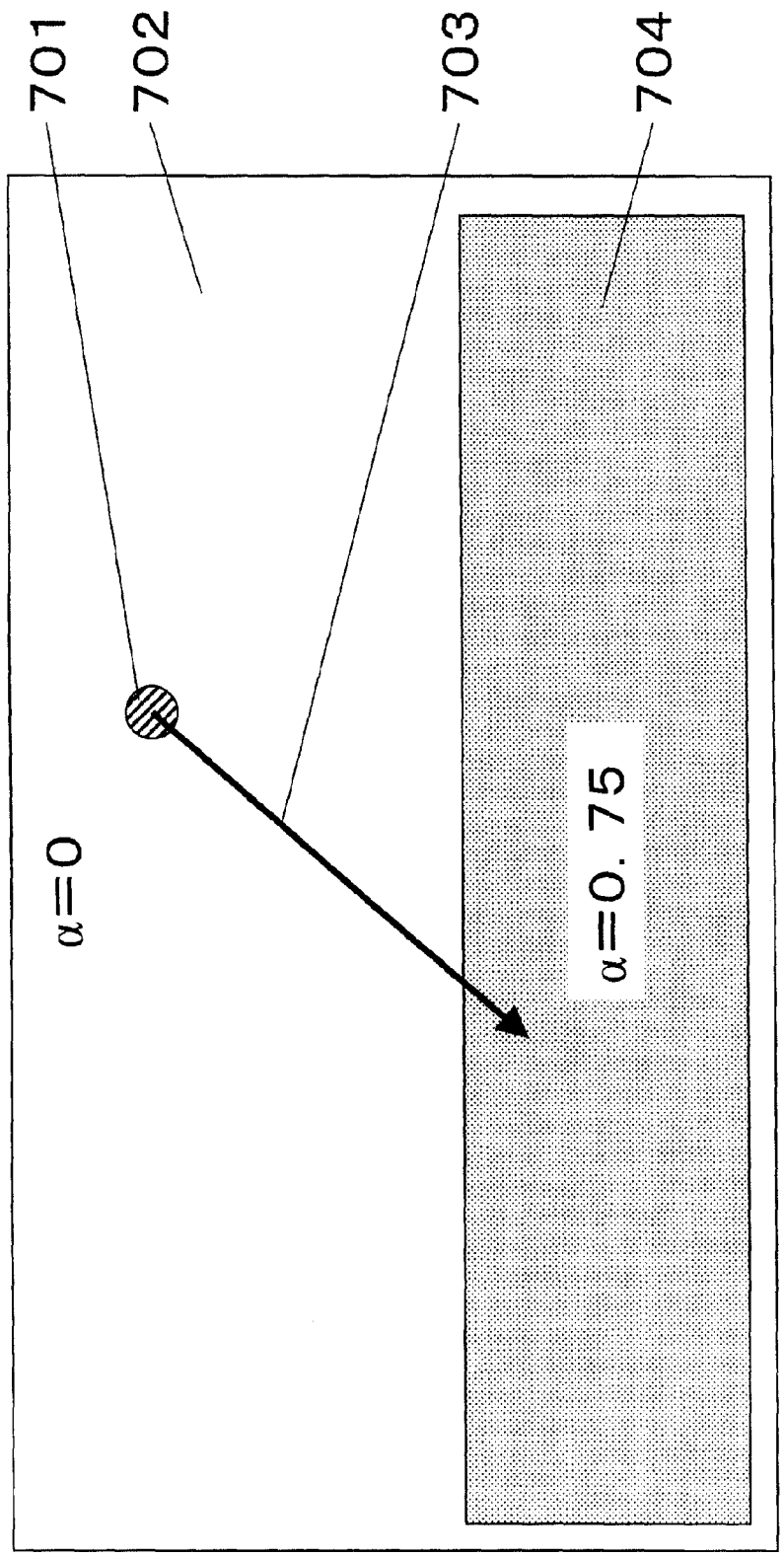

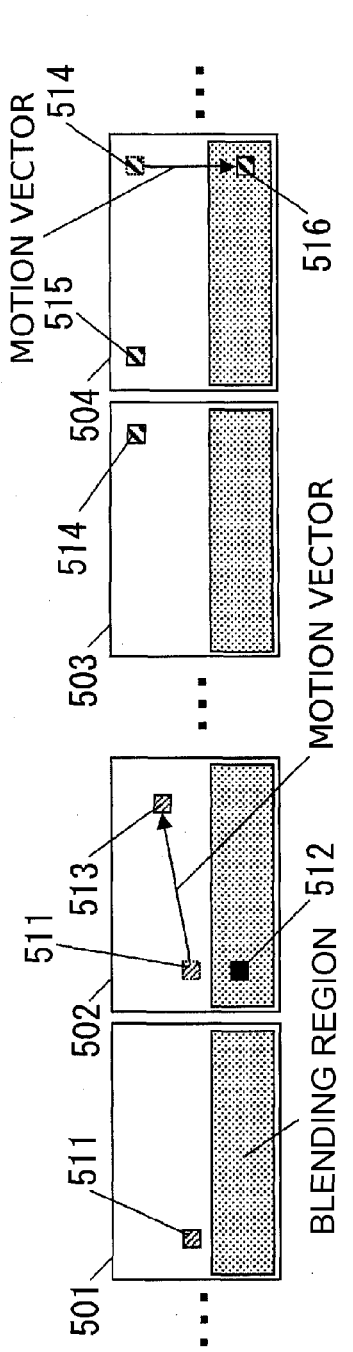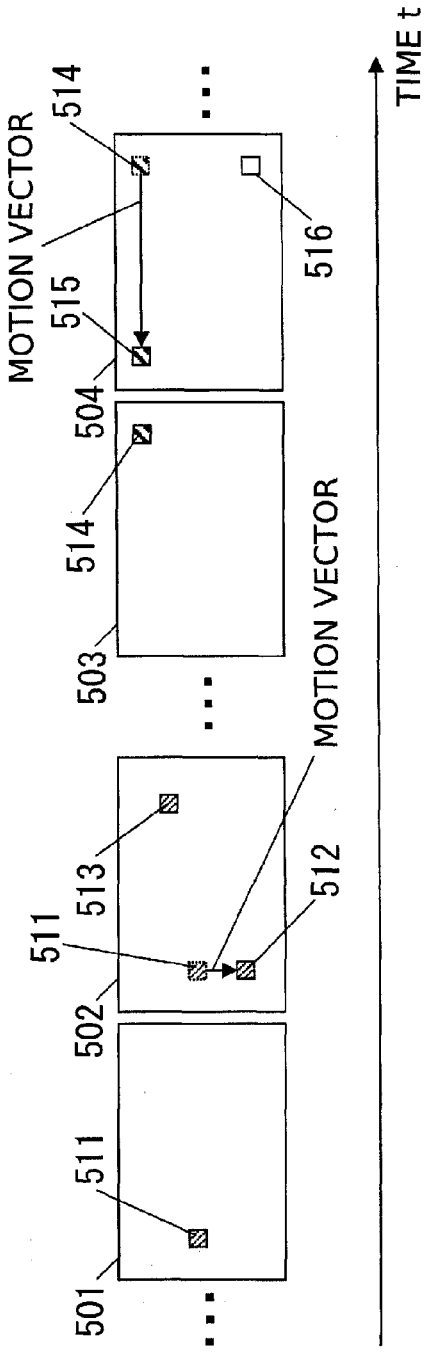

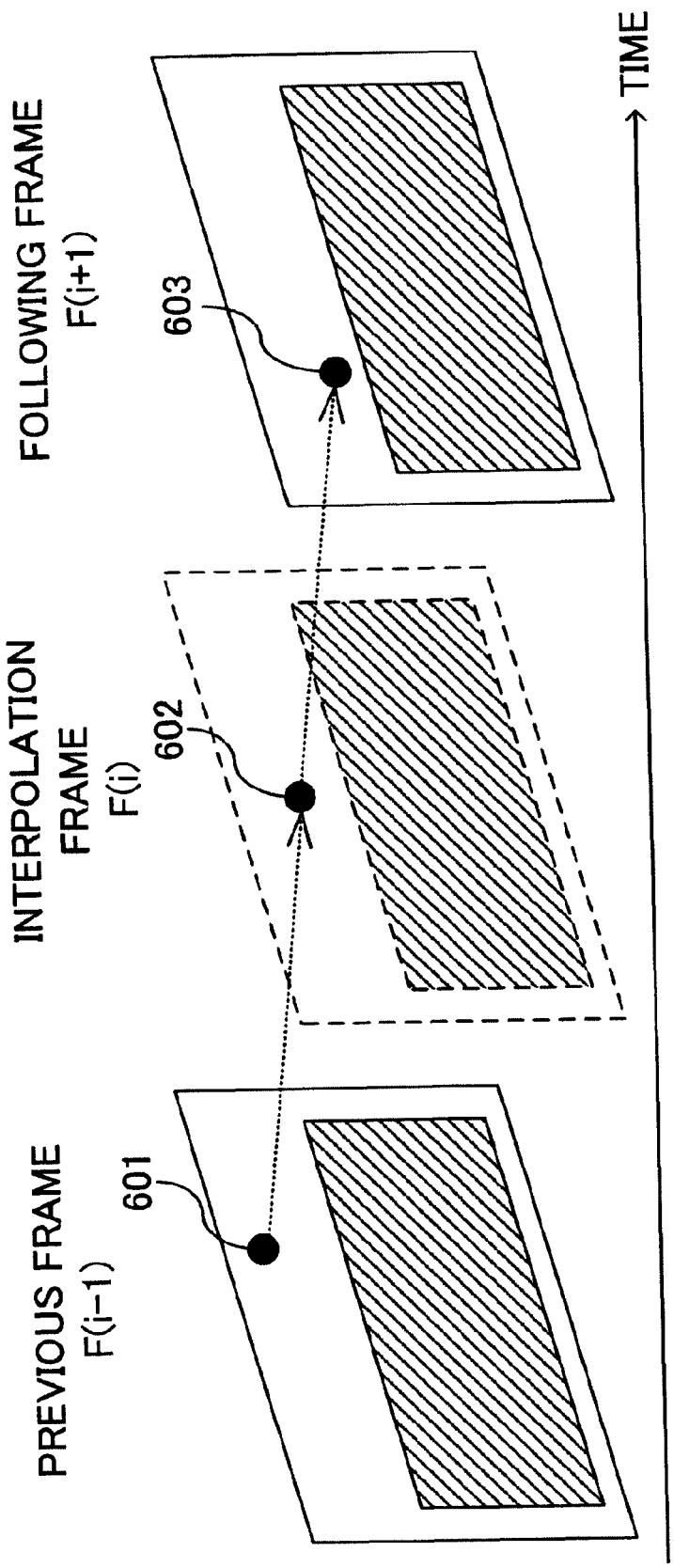

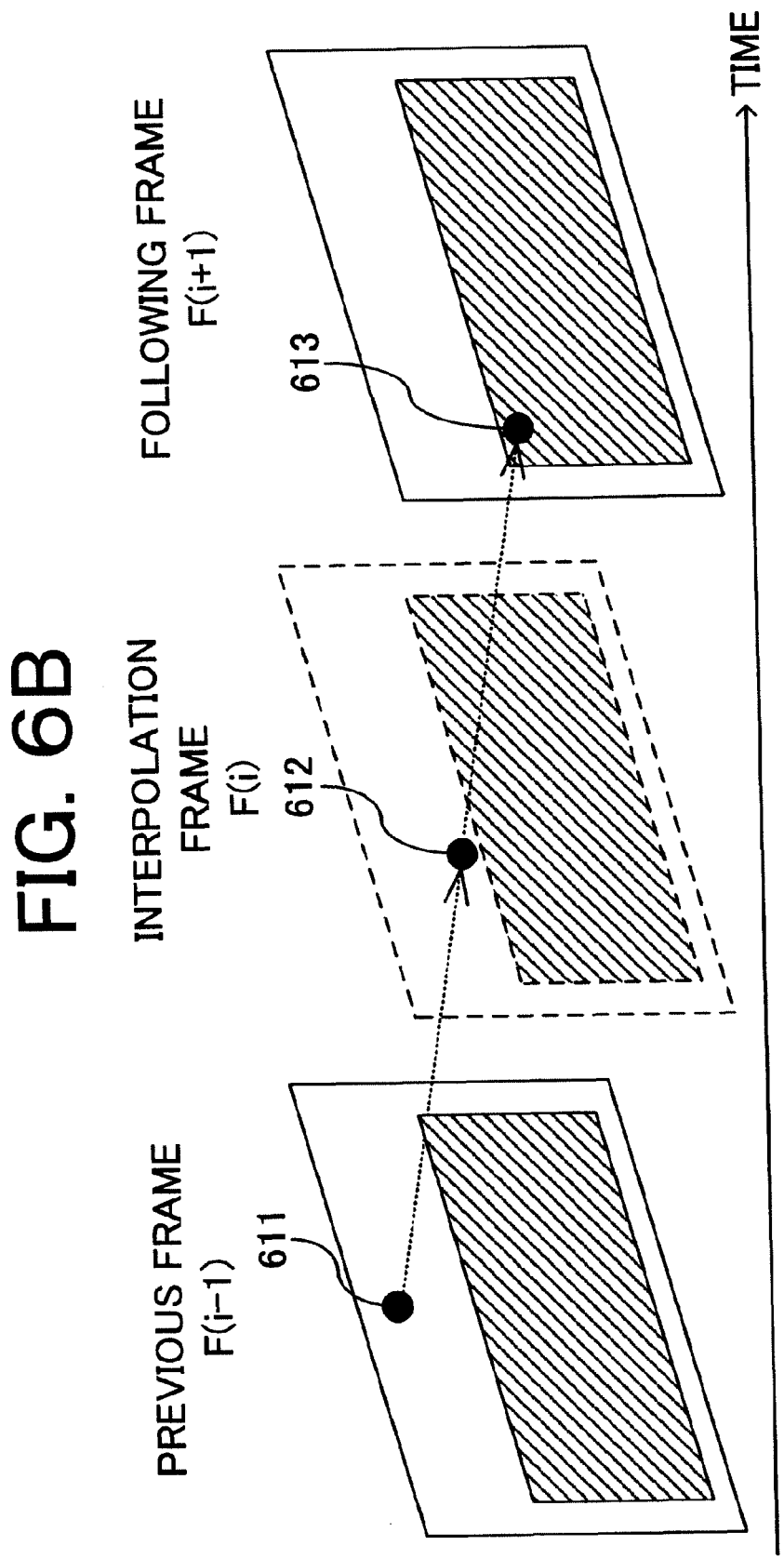

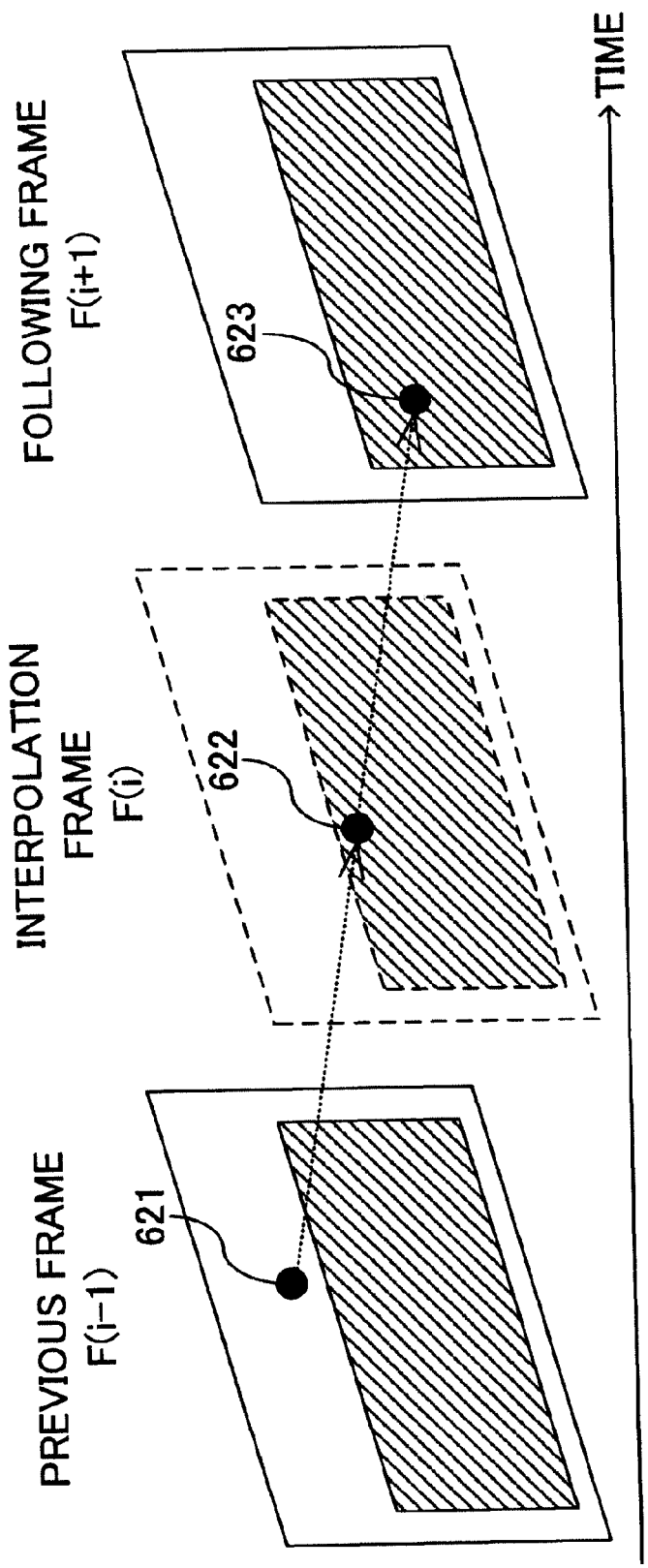

FRAME RATE CONVERSION APPARATUS AND CONTROL METHOD THEREOF

BACKGROUND OF THE INVENTION

1. Field of the Invention

The present invention relates to a frame rate conversion apparatus and a control method thereof.

2. Description of the Related Art

There is a conventional technology for converting frame rates of a synthesized moving image which is a moving image synthesized with a still image, by inserting an interpolation frame between the frames of the synthesized moving image. In such technologies, there is the problem of deterioration of images of the interpolation frames during generation of the interpolation frames. An example of a method used to solve such problems is a method in which frame rate conversion is carried out accompanying detection of motion vectors for moving image portions of the synthesized moving image followed by frame rate conversion not accompanying detection of motion vectors for still image portions (Japanese Patent Application Laid-open Nos. 2008-160591 and 2008-228233). In the technologies disclosed in Japanese Patent Application Laid-open Nos. 2008-160591 and 2008-228233, the above-mentioned method is intended to inhibit deterioration of still image portions. However, there is the risk of erroneous detection of motion vectors since the motion vectors are detected from the synthesized moving image. In addition, there is the risk of disruption (deterioration) of an image of the interpolation frames in the case the detected motion vectors have indicated the pixel locations of still image portions.

SUMMARY OF THE INVENTION

An object of the present invention is to provide a technology that is able to accurately detect motion of picture for a synthesized moving image which is a moving image synthesized with a still image, and is further able to convert a frame rate of the synthesized moving image by generating an interpolation frame in which image deterioration has been inhibited.

A first aspect of a frame rate conversion apparatus according to the present invention is a frame rate conversion apparatus that converts a frame rate of a synthesized moving image which is a moving image synthesized with a still image, by inserting an interpolation frame between frames of the synthesized moving image, the apparatus comprising:

a detection unit that generates motion information by detecting motion of picture at each pixel location from a moving image which is not synthesized with a still image;

a synthesizing unit that generates a synthesized moving image by synthesizing a still image on a blending region in the moving image at a prescribed opacity;

a judgment unit that determines whether or not a pixel of interest of an interpolation frame to be inserted between frames of the synthesized moving image generated by the synthesizing unit is a pixel within the blending region; and a generation unit that generates the interpolation frame, wherein the generation unit sets a value of a pixel at the same location as the pixel of interest in a frame of the synthesized moving image before or after the interpolation frame to the pixel of interest in a case where the pixel of interest of the interpolation frame is determined to be pixel within the blending region, and sets a value of the pixel of interest based on a value of a corresponding pixel at a location specified by motion information corresponding to the pixel of interest in at least one of frames of the synthesized moving image before and after the interpolation frame in a case where the pixel of interest of the interpolation frame is determined to not be within the blending region.

A second aspect of a frame rate conversion apparatus according to the present invention is a frame rate conversion apparatus that converts a frame rate of a synthesized moving image which is a moving image synthesized with a still image, by inserting an interpolation frame between frames of the synthesized moving image, the apparatus comprising:

a detection unit that generates motion information by detecting motion of picture at each pixel location from a moving image which is not synthesized with a still image;

a synthesizing unit that generates a synthesized moving image by synthesizing a still image on a blending region in the moving image at a prescribed opacity;

a judgment unit that determines whether or not the opacity is greater than a prescribed threshold value; and a generation unit that generates an interpolation frame, wherein the generation unit sets values of pixels of a frame of the synthesized moving image before or after the interpolation frame to pixels of the interpolation frame, respectively, in a case where the opacity is determined to be greater than the prescribed threshold value, and sets a value of a pixel of interest of the interpolation frame based on a value of a corresponding pixel at a location specified by motion information corresponding to the pixel of interest in at least one of frames of the synthesized moving image before and after the interpolation frame in a case where the opacity is determined to be equal to or less than the prescribed threshold value.

According to the present invention, a technology can be provided that is able to accurately detect motion of picture for a synthesized moving image which is a moving image synthesized with a still image, and is further able to convert a frame rate of the synthesized moving image by generating an interpolation frame in which image deterioration has been inhibited.

Further features of the present invention will become apparent from the following description of exemplary embodiments with reference to the attached drawings.

BRIEF DESCRIPTION OF THE DRAWINGS

FIG. 1 is a block diagram showing the functional configuration of a frame rate conversion apparatus according to the present embodiment;

FIG. 2 is a flow chart showing an example of blending region signal generation processing;

FIG. 3 is a drawing showing an example of a frame image;

FIGS. 5A and 5B are drawings for explaining motion vector detection processing;

FIGS. 6A to 6C are drawings showing examples of generating interpolation frame data from synthesized image data.

DESCRIPTION OF THE EMBODIMENTS

<Embodiment 1>

Figure 4A:
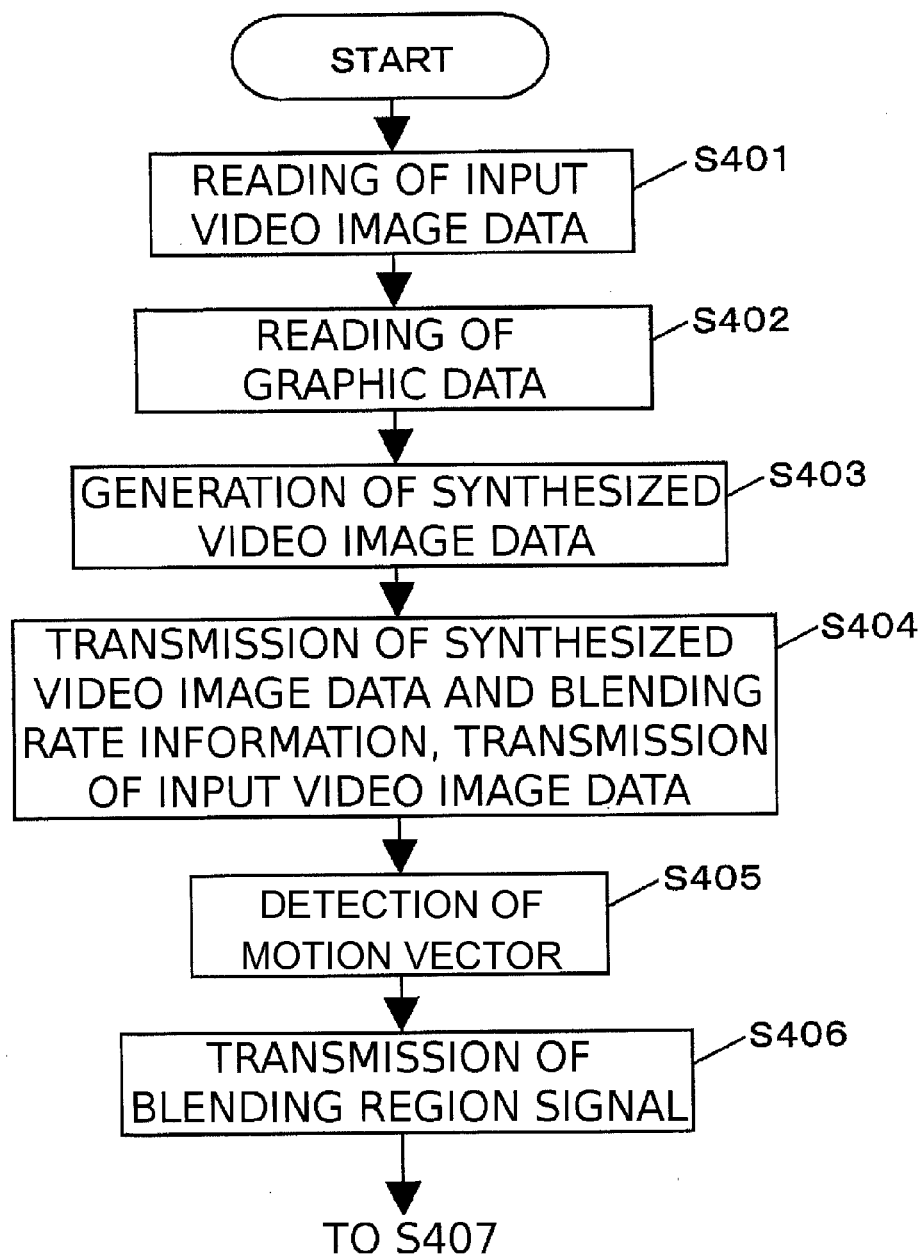
FIGS. 4A and 4B are flow charts showing an example of final interpolation frame generation processing of an Embodiment 1.

The following provides an explanation of a frame rate conversion apparatus and a control method thereof according to Embodiment 1 of the present invention. The frame rate conversion apparatus according to the present embodiment converts a frame rate of a synthesized moving image which is a moving image synthesized with a still image, by inserting an interpolation frame between frames of the synthesized moving image.

(Configuration)

FIG. 1 is a block diagram showing the functional configuration of the frame rate conversion apparatus according to the present embodiment.

A video image input unit 101 writes input video image data (a moving image which is not synthesized with a still image) input to the frame rate conversion apparatus to a frame memory 102.

A motion vector detection unit 108 generates motion information from the input video image data by detecting motion of picture at each pixel location. More specifically, the motion vector detection unit 108 detects motion vectors between frames from the input video image data for each pixel location and outputs the detection results in the form of motion vector data.

A synthesizing unit 104 combines graphic data with a region (blending region) of a portion of the input video image data (moving image) at a predetermining blending rate (opacity) to generate synthesized video image data (synthesized moving image which is synthesized with a still image). The graphic data consists of still images such as figures, characters or designs used for GUI and the like, which are accumulated in a graphic memory 105. In addition, synthesized video image data generated by the synthesizing unit 104 is written to a frame memory 110.

A synthesized video image output unit 112 reads synthesized video image data from the frame memory 110.

A blending region signal generation unit 107 determines whether or not each pixel is a pixel within a blending region for each frame of the synthesized video image data, and outputs the result of that determination in the form of a blending region signal. A blending region is a region which is synthesized a still image in a synthesized moving image. Whether or not a pixel is a pixel within a blending region is determined using a threshold value of the blending ratio that is preset with a threshold value setting unit 106.

A motion interpolation frame generation unit 111 generates interpolation frame data (interpolation frames) from synthesized video image data based on motion information (motion vector data).

A final interpolation frame output unit 113 outputs synthesized video image data for which frame rate has been converted to a video image output unit 114 in the form of output video image data. More specifically, the final interpolation frame output unit 113 selects a value of a pixel (pixel value) of either the synthesized video image data or the interpolation frame data as a value of each pixel of the final interpolation frame. Furthermore, in the present embodiment, the final interpolation frame output unit 113 generates and outputs (to be subsequently described in detail) the final interpolation frame data using the results of a determination by a pixel judgment unit 109 (described below).

The pixel judgment unit 109 determines whether pixel values assigned to each pixel of the final interpolation frame are to be read from the motion interpolation frame generation unit 111 or the synthesized video image output unit 112 using the motion vector data and the blending region signal. The result of this determination is then output to the final interpolation frame output unit 113.

The video image output unit 114 carries out frame rate conversion by inserting the final interpolation frame output from the final interpolation frame output unit 113 between each frame of the synthesized moving image read from the frame memory 110. Video image data that has undergone frame rate conversion is then output to an accumulation unit in a subsequent processing stage, such as that of a video image processing apparatus, display apparatus or memory device.

Furthermore, a magnetic recording medium such as a hard disc, or random access memory such as volatile memory or non-volatile memory, can be applied for the frame memory 102, graphic memory 105 and frame memory 110 of FIG. 1.

(Generation of Blending Region Signals)

The following provides an explanation of processing flow through generation of blending region signals using the flow chart of FIG. 2.

First, the synthesizing unit 104 outputs the synthesized video image data and information on the blending rate (blending rate information) to the blending region signal generation unit 107 (S201). If the pixel value of a moving image is defined as A, the pixel value of a still image is defined as B, and the blending rate is defined as a (where, $0 \le \alpha \le 1$), then a pixel value C of a synthesized moving image can be represented by, for example, the following equation 1.

$$C = (1-\alpha) \times A + \alpha \times B \quad \text{(Equation 1)}$$

Furthermore, when $\alpha=0$, this means that a still image has not been synthesized.

The blending region signal generation unit 107 determines whether or not the corresponding blending rate $\alpha$ of each pixel is greater than a threshold value set with the threshold value setting unit 106 for each frame of the synthesized video image data (S202). In the case the blending rate $\alpha$ is greater than the threshold value (YES in S202), then the blending region signal generation unit 107 determines that pixel to be a pixel within a blending region and sets the blending region signal to ENABLE (S203). In the case the blending rate $\alpha$ is equal to or less than the threshold value (NO in S202), then the blending region signal generation unit 107 determines that pixel to be a pixel outside a blending region and sets the blending region signal to DISABLE (S204). The threshold value is, for example, a maximum value of the blending rate for which moving images are more conspicuous than still images. Furthermore, the threshold value may be fixed value, or may be set corresponding to the type of image (image characteristics) for each frame. The threshold value may also set in accordance with the preferences of a manufacturer or user.

FIG. 3 shows examples of a blending region and a non-blending region. A region 702 in FIG. 3 indicates a region where the blending rate $\alpha$ is equal to or less than the threshold value (non-blending region). A region 704 indicates a region where the blending rate $\alpha$ is greater than the threshold value (blending region).

(Generation of Final Interpolation Frame)

Figure 4B:
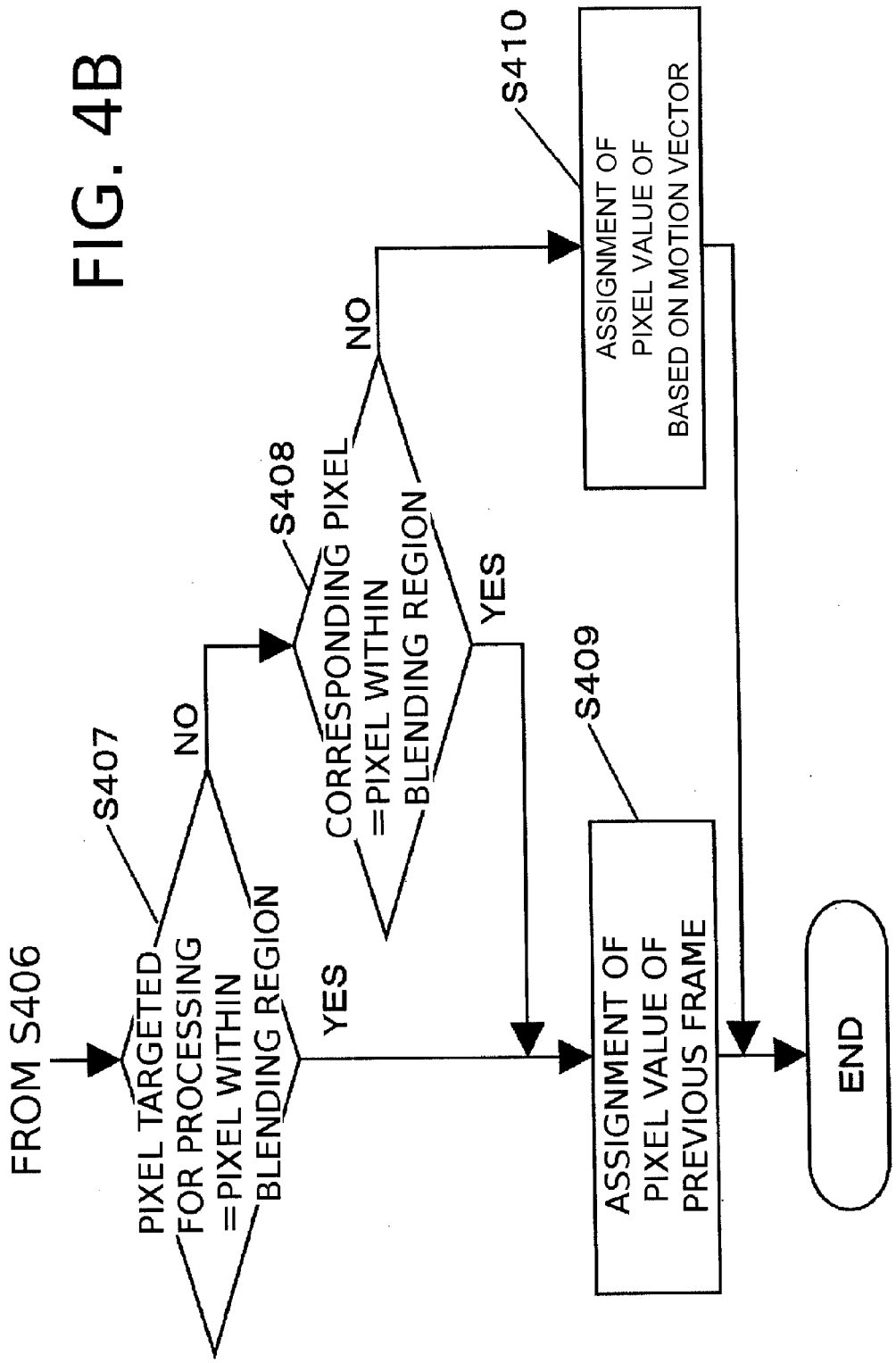

The following provides an explanation of processing for generation of the final interpolation frame by the frame rate conversion apparatus according to the present embodiment using the flow charts of FIGS. 4A and 4B.

First, the input video image output unit 103 and the synthesizing unit 104 read input video image data from the frame memory 102 (S401). The synthesizing unit 104 then reads graphic data from the graphic memory 105 (S402). Next, the synthesizing unit 104 combines the read input video image data and graphic data at a prescribed blending rate α (S403).

The synthesizing unit 104 outputs synthesized video image data to the motion interpolation frame generation unit 111 together with outputting synthesized video image data and blending rate information to the blending region signal generation unit 107. In addition, the input video image output unit 103 outputs input video image data to the motion vector detection unit 108 in synchronization therewith (S404).

Next, the motion vector detection unit 108 detects a motion vector between frames from the input video image data, and outputs the result of that detection to the motion interpolation frame generation unit 111 and the pixel judgment unit 109 in the form of motion vector data (S405). In the present embodiment, erroneous detection and detection omissions of motion vector can be inhibited by detecting motion vectors from input video image data (a moving image before a still image is synthesized thereinto) instead of from synthesized video image data (a synthesized moving image after a still image is synthesized thereinto). The following provides a detailed explanation of this using FIGS. 5A and 5B. Furthermore, the following explanation uses the case of detecting a pixel corresponding to a pixel of a frame at a certain time from a frame that follows that frame.

FIG. 5A is a drawing showing an example of the prior art of the case of detecting a motion vector from synthesized video image data. In this case, there is the potential for the occurrence of erroneous detection and detection omissions of motion vectors. For example, there is the risk of erroneous detection or detection omission occurring in the case a pixel 511 of a frame 501 at a certain time (pixel outside a blending region) corresponds to a pixel 512 of a frame 502 immediately thereafter (pixel within a blending region). More specifically, the pixel 512 has a different pixel value from the pixel value at the time of input (pixel value of input video image data) as a result of being blended with a still image. Consequently, the motion vector detection unit 108 is unable to detect the pixel 512 as the pixel corresponding to the pixel 511 (detection omission). Moreover, there is the risk of a pixel different from the pixel 512 (for example, pixel 513 in FIG. 5A) ending up being detected as the pixel corresponding to the pixel 511 (erroneous detection).

In addition, there is also the risk of erroneous detection in the case a pixel 514 of a frame 503 at a certain time (pixel outside a blending area) corresponds to a pixel 515 of a frame 504 immediately thereafter (pixel outside a blending area). More specifically, a pixel value within a blending area of the frame 504 may become close to a value of the pixel 514 as a result of being blended with a still image. Consequently, instead of detecting the pixel 515, the motion vector detection unit 108 ends up detecting a pixel within a blending area of the frame 504 (such as a pixel 516 of FIG. 5A) as the pixel corresponding to the pixel 514 (erroneous detection).

There is also the risk of erroneous detection and detection omission for similar reasons in the case a pixel of a frame at a certain time is a pixel within a blending region.

This detection omission and erroneous detection of video image motion is caused by disturbance of interpolation frame images.

On the other hand, as shown in FIG. 5B, since video image motion is detected from input video image data (a moving image before a still image is synthesized thereinto) in the present embodiment, erroneous detection and detection omission as described above do not occur.

Furthermore, although not shown in FIGS. 4A and 4B, the motion interpolation frame generation unit 111 generates interpolation frame data from synthesized video image data based on motion vector data as previously described. More specifically, interpolation frame data is generated by detecting corresponding pixels (pixels corresponding to pixels of interpolation frames), for which location has been specified on the basis of motion information (motion vector data), from a frame following an interpolation frame (frame of a synthesized moving image, or following frame).

FIGS. 6A to 6C are drawings showing examples of the formation, by the motion interpolation frame generation unit 111, of interpolation frame data from synthesized video image data based on motion vector data. In FIG. 6A, a pixel 602 of an interpolation frame F(i) is located at an intermediate location of a motion vector that connects a pixel 601 of a previous frame F(i−1) and a pixel 603 of a following frame F(i+1) of synthesized video image data. The average value of a value of the pixel 601 and a value of the pixel 603 is calculated to obtain a value of the pixel 602. Since the pixel locations of the pixels 601 to 603 are all outside a blending area, a value of the pixel 602 outside the blending area of the interpolation frame F (i) is not affected by a still image of the blending area.

In FIG. 6B, a pixel 612 of an interpolation frame F(i) is located at an intermediate location of a motion vector that connects a pixel 611 of a previous frame F(i−1) and a pixel 613 of a following frame F (i+1) of synthesized video image data. The average value of a value of the pixel 611 and a value of the pixel 613 is calculated to obtain a value of the pixel 612. The pixel locations of the pixels 611 and 612 are outside a blending area, while the pixel location of the pixel 613 is within a blending area. Consequently, a value of the pixel 613 within the blending area of the following frame F(i+1) ends up influencing a value of the pixel 612 outside the blending region of the interpolation frame F(i).

In FIG. 6C, a pixel 622 of an interpolation frame F(i) is located at an intermediate location of a motion vector that connects a pixel 621 of a previous frame F(i−1) and a pixel 623 of a following frame F(i+1) of synthesized video image data. The average value of a value of the pixel 621 and a value of the pixel 623 is calculated to obtain a value of the pixel 622. The pixel location of the pixel 621 is outside a blending area, while the pixel locations of the pixels 622 and 623 are within a blending area. Consequently, a value of the pixel 621 outside the blending region of the previous frame F(i−1) ends up influencing a value of the pixel 622 within the blending region of the interpolation frame F(i).

Next, following S405, the blending region signal generation unit 107 determines whether each pixel is a pixel within a blending region for each frame of the synthesized video image data, and outputs the result of that determination to the pixel judgment unit 109 in the form of a blending region signal (S406). Furthermore, the location of each pixel within the frame of synthesized image data and the location of each pixel within the interpolation frame are assumed to be the same without being shifted out of position. Namely, determination results for each pixel within each frame of synthesized video image data as determined by the blending region signal generation unit 107 can be interchanged with the determination results for each pixel within the interpolation frame (final interpolation frame). The pixel judgment unit 109 then determines whether the pixel value of the final interpolation frame is to be read from the motion interpolation frame generation unit 111 or the synthesized video image output unit 112 using the motion vector data and blending region signal, and outputs the result of that determination to the final interpolation frame output unit 113.

More specifically, in 5407, the pixel judgment unit 109 determines whether or not the pixel of interest (pixel targeted for processing) of the final interpolation frame is a pixel within a blending region. As shown in FIG. 6C, when a pixel value determined based on motion vector data is assigned to a pixel in a blending region, there is the risk of a image (a still image) within the blending region being disrupted. Consequently, in the case a pixel of interest targeted for processing of the final interpolation frame is a pixel within a blending region (YES in S407), the pixel judgment unit 109 determines that the pixel value assigned to that pixel is to be read from the synthesized video image output unit 112, after which processing proceeds to S409. In the case the pixel of interest targeted for processing is not a pixel in a blending region (NO in S407), processing proceeds to S408.

In S408, the pixel judgment unit 109 determines whether or not a pixel corresponding to the pixel of interest targeted for processing of the final interpolation frame is a pixel within a blending region. More specifically, it determines whether or not the pixel indicated by a motion vector corresponding to the pixel of interest targeted for processing of the final interpolation frame (pixel of the frame after the final interpolation frame) is a pixel within a blending region. As shown in FIG. 6B, when a pixel value determined based on motion vector data is assigned to a pixel of interest for which the corresponding pixel is a pixel within a blending region, since this means that a pixel in which a moving image and still image have been blended is present at a location not within a blending region, there is the risk of the image being disrupted. Consequently, in the case a corresponding pixel of a pixel of interest targeted for processing of the final interpolation frame is a pixel that is within a blending area (YES in S408), the pixel judgment unit 109 determines that the pixel value assigned to that pixel is to be read from the synthesized video image output unit 112, after which processing proceeds to S409. In the case a corresponding pixel of a pixel of interest targeted for processing of the final interpolation frame is not a pixel within a blending region (NO in S408), the pixel judgment unit 109 determines that the pixel value assigned to that pixel is to be read from the motion interpolation frame generation unit 111, after which processing proceeds to S410. Furthermore, the pixel judgment unit 109 regards a motion vector connecting the pixel 611 of the previous frame F(i−1) and the pixel 613 of the following frame F (i+1) as a motion vector correlated with the pixel 612 of the interpolation frame F(i).

In S409, the final interpolation frame output unit 113 assigns a pixel value of the same location (same location as the pixel targeted for processing) in the frame previous to the final interpolation frame (frame of synthesized moving image, previous frame) to a pixel of interest targeted for processing of the final interpolation frame.

In S410, the final interpolation frame output unit 113 assigns a pixel value of the same location in the interpolation frame generated by the motion interpolation frame generation unit 111 to the location of a pixel of interest targeted for processing of the final interpolation frame.

The final interpolation frame is generated by carrying out the above-mentioned processing for each pixel of the final interpolation frame.

The following provides an explanation of a final interpolation frame image using FIG. 3. In FIG. 3, the region 704 is a blending region to which a pixel value of a previous frame is assigned. The region 702 is a region that is not a blending region to which is assigned a pixel value of an interpolation frame generated by the motion interpolation frame generation unit 111. A pixel 701 is a pixel in which the corresponding motion vector 703 indicates a pixel within a blending region of a following frame, and is the pixel to which is assigned the pixel value of the previous frame.

In this manner, according to the present embodiment, since the motion of picture is detected from a moving image prior to being synthesized with a still image, erroneous detection and detection omissions of motion vectors can be reduced.

In addition, according to the present embodiment, pixel values of the same location in a previous frame are assigned to a pixel within a blending region and a pixel for which the corresponding pixel is a pixel within a blending region. Pixel values based on motion information are assigned to other pixels. As a result, deterioration of (final) interpolation frame images can be inhibited.

Furthermore, the processing of S408 in FIG. 4B is not required by the present invention, but rather the processing of S408 may be omitted. In other words, in the case a pixel of interest targeted for processing of the final interpolation frame is not a pixel in a blending region (NO in S407), processing may proceed to S410.

In addition, although processing has been explained in the present embodiment as proceeding that proceeds to S409 in the case of YES in S408 (the case in which a pixel of interest targeted for processing of the final interpolation frame is a pixel outside a blending region, and a pixel of a following frame indicated by a motion vector corresponding to the pixel of interest targeted for processing is within a blending region) in FIG. 4B, other exception processing may also be carried out. More specifically, in FIG. 6B, a value of the pixel 612 of the interpolation frame F(i) may be made to have the same value as a value of the pixel 611 of the previous frame F(i−1) of synthesized video image data. In other words, a value of a corresponding pixel of the previous frame specified by the motion vector corresponding to the pixel of interest targeted for processing is assigned as a value of the pixel of interest targeted for processing of the final interpolation frame. Whereupon, a value of the pixel 612 outside a blending region of the interpolation frame F(i) is not affected by a value of the corresponding pixel 613 within a blending region of the following frame F(i+1).

In addition, exception processing may also be similarly carried out in the case a pixel of interest targeted for processing of the final interpolation frame is a pixel outside a blending region, and a pixel of the previous frame specified by the motion vector corresponding to the pixel of interest targeted for processing is a pixel within a blending region. More specifically, a value of a corresponding pixel of the following frame specified by the motion vector corresponding to the pixel of interest targeted for processing is assigned as a value of the pixel of interest targeted for processing of the final interpolation frame. Whereupon, the pixel value is not affected by a value of a corresponding pixel within a blending region in the frame previous to the final interpolation frame.

Furthermore, although pixel values of the same location in the previous frame are assigned to a pixel within a blending area and a pixel for which the corresponding pixel is a pixel within a blending area in the present embodiment, a pixel value of the same location in a following frame may also be assigned to such pixels.

In addition, the interpolation frame generated by the motion interpolation frame generation unit 111 may be the final interpolation frame. Since erroneous detection and detection omissions of motion vectors are reduced in the present embodiment, the motion interpolation frame generation unit 111 is able to generate interpolation frames in which image deterioration caused by this erroneous detection and detection omissions is inhibited. Furthermore, although the corresponding pixel is detected from the following frame in the present embodiment, a corresponding pixel may also be detected from the previous frame, or a corresponding pixel may be detected from both the previous frame and the following frame.

Furthermore, the threshold value set with the threshold value setting unit 106 may be 0. Namely, regions having a blending ratio α that is greater than 0 may be defined as blending regions. However, moving images become more conspicuous than still images if the blending ratio is excessively small. Consequently, in the case a still image is synthesized with a moving image at small blending ratio in this manner, it is preferable to assign pixel values based on motion information to pixels in the region where the still image is synthesized. If the maximum value of the blending ratio for which moving images are more conspicuous than still images is used for the threshold value, suitable pixel values can be assigned to those pixels in the region where the still image is synthesized.

<Embodiment 2>

The following provides an explanation of a frame rate conversion apparatus and control method thereof according to Embodiment 2 of the present invention. In the present embodiment, the previous frame is used as the final interpolation frame in the case a synthesized moving image contains a blending region. Furthermore, the configuration and blending region signal generation processing of the frame rate conversion apparatus according to the present embodiment are the same as those of Embodiment 1 (FIGS. 1 and 2), and explanations thereof are omitted.

(Generation of Final Interpolation Frame)

Figure 7A:
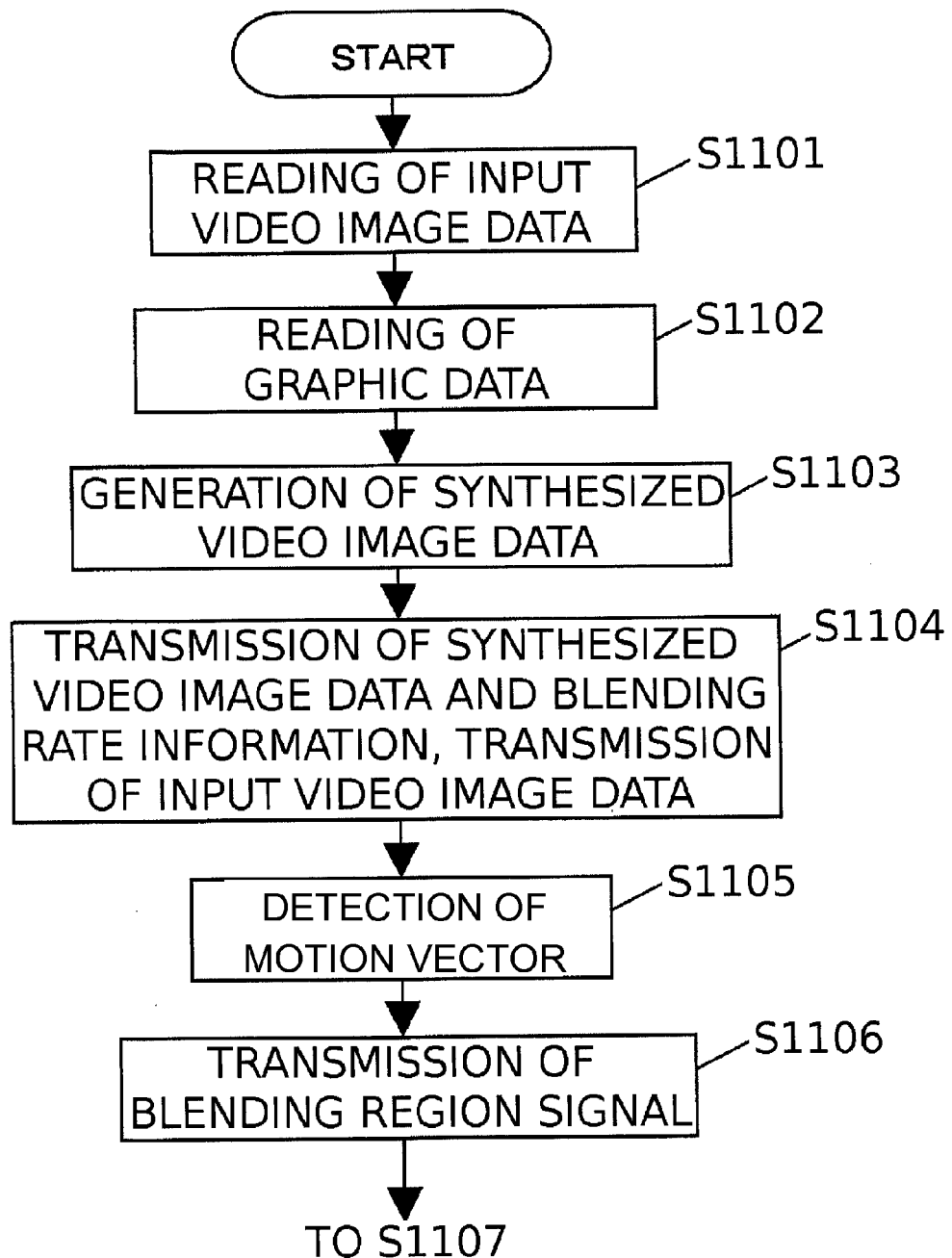
FIGS. 7A and 7B are flow charts showing an example of final interpolation frame generation processing of an Embodiment 2.
Figure 7B:
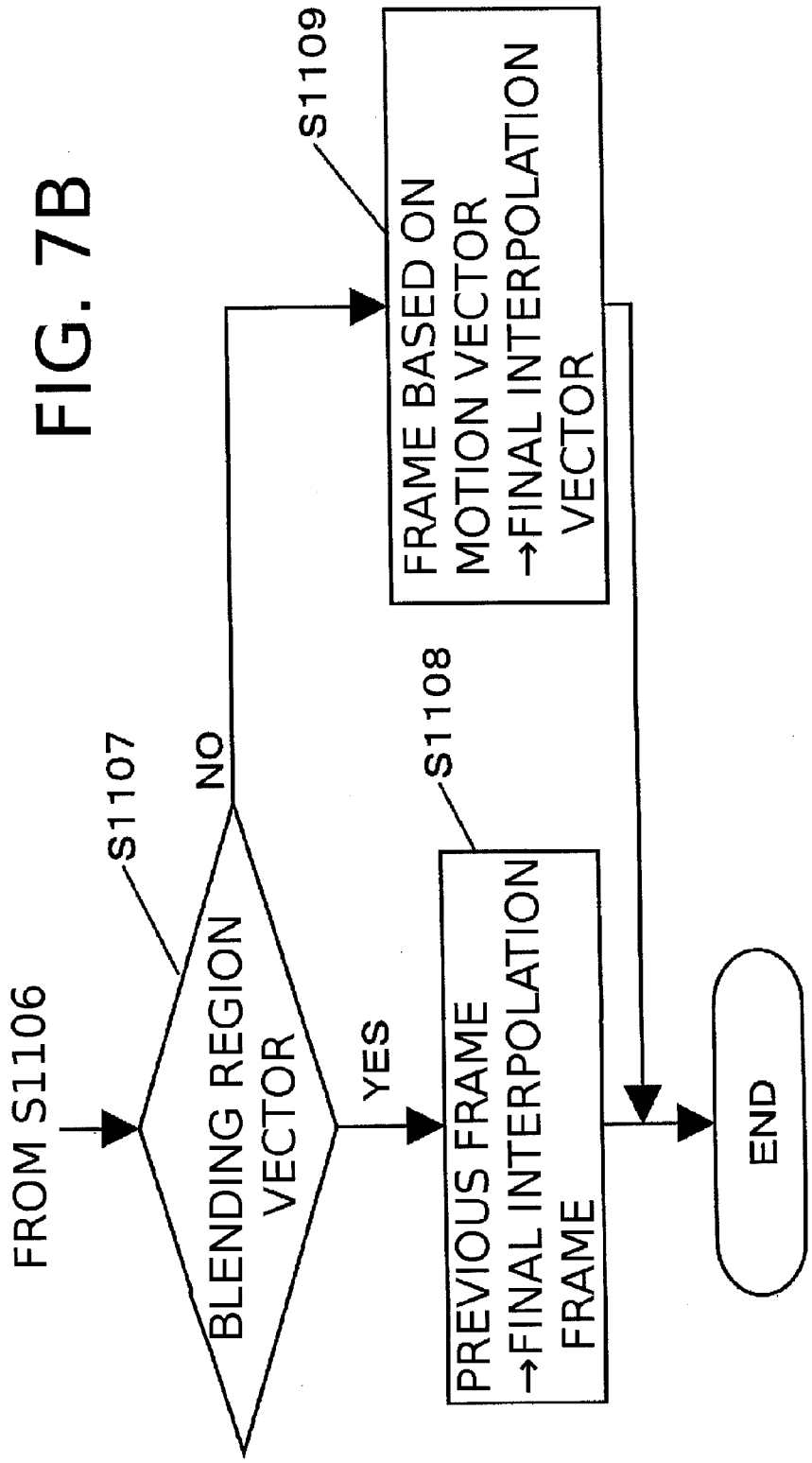

The following provides an explanation of final interpolation frame generation processing of the frame rate conversion apparatus according to the present embodiment using the flow charts of FIGS. 7A and 7B.

The processing of S1101 to S1106 is the same as that of Embodiment 1 (S401 to S406 in FIG. 4A), and an explanation thereof is omitted.

Following S1106, the pixel judgment unit 109 determines whether or not synthesized video image data contains a blending region from a blending region signal (S1107). Furthermore, as explained in Embodiment 1, the blending region signal generation unit 107 determines whether or not each pixel is within a blending region for each frame of the synthesized video image data by using the threshold value of blending ratio preset with the threshold value setting unit 106. The blending region signal generation unit 107 then outputs the result of that determination in the form of a blending region signal. In the case the synthesized video image data contains a blending area (YES in S1107), the final interpolation frame output unit 113 respectively assigns a pixel value of the same location in the previous frame to each pixel of the final interpolation frame (S1108). Namely, the previous frame is defined as the final interpolation frame (each pixel value of the final interpolation frame is made to be the same as each pixel value of the previous frame). In the case the synthesized video image data does not contain a blending region (NO in S1107), the final interpolation frame output unit 113 defines the interpolation frame generated by the motion interpolation frame generation unit 111 to be the final interpolation frame (S1109).

In this manner, according to the present embodiment, in the case a synthesized moving image contains a blending region (case in which there is the risk of disruption of interpolation frame images), the previous frame is used as the final interpolation frame. As a result, deterioration of interpolation frame images can be inhibited. In addition, in the case a synthesized moving image does not contain a blending region (case in which there is no risk of disruption of interpolation frame images), an interpolation frame generated based on motion information is used for the final interpolation frame, thereby making it possible to express motion smoothly.

Furthermore, although the previous frame is used for the final interpolation frame in the present embodiment in the case a synthesized moving image contains a blending region, the following frame may also be used for the final interpolation frame.

In addition, the pixel judgment unit 109 may output the result of determining whether or not synthesized video image data contains a blending region instead of outputting the result of determining whether or not a pixel is within a blending region for each pixel. The pixel judgment unit 109 may also determine all pixels of an interpolation frame to be within a blending region in the case synthesized video image data contains a blending region, and may output the result of that determination. The pixel judgment unit 109 may also determine all pixels of an interpolation frame to not be within a blending region in the case synthesized video image data does not contain a blending region, and may output the result of that determination.

As has been described above, according to the above-mentioned Embodiments 1 and 2, motion of picture can be accurately detected for the synthesized moving image which is a moving image synthesized with a still image. As a result, the frame rate of the synthesized moving image can be converted by generating interpolation frames in which image deterioration has been inhibited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-139902, filed on Jun. 11, 2009, and Japanese Patent Application No. 2010-053641, filed on Mar. 10, 2010, which are hereby incorporated by reference herein in their entirety.

What is claimed is:

1. A frame rate conversion apparatus that converts a frame rate of a synthesized moving image which is a moving image synthesized with a still image, by inserting an interpolation frame between frames of the synthesized moving image, the apparatus comprising:

a detection unit that generates motion information by detecting motion of a picture at each pixel location from a moving image which is not synthesized with a still image;

a synthesizing unit that generates a synthesized moving image by synthesizing a still image on a blending region in the moving image at a prescribed opacity;

a judgment unit that determines whether or not a pixel of interest of an interpolation frame to be inserted between frames of the synthesized moving image generated by the synthesizing unit is a pixel within the blending region; and a generation unit that generates the interpolation frame, wherein the generation unit (a) sets a value of the pixel of interest to be a value of a pixel at the same location as the pixel of interest in a frame of the synthesized moving image before or after the interpolation frame in a case where the pixel of interest is determined to be a pixel within the blending region, and (b) sets a value of the pixel of interest based on a value of a corresponding pixel at a location specified by motion information corresponding to the pixel of interest in at least one of frames of the synthesized moving image before and after the interpolation frame in a case where the pixel of interest is determined to not be within the blending region, wherein the detection unit and the synthesizing unit are connected with the generation unit, and wherein the detection unit is not connected with the synthesizing unit.

2. The frame rate conversion apparatus according to claim 1, wherein the judgment unit determines all pixels of the interpolation frame to not be within the blending region in a case where the opacity is equal to or less than a prescribed threshold value.

3. The frame rate conversion apparatus according to claim 1, wherein the judgment unit determines whether or not the corresponding pixel is a pixel within the blending region by specifying the location of the corresponding pixel in a frame of the synthesized moving image before and after the interpolation frame based on the motion information corresponding to the pixel of interest, and wherein the generation unit sets a value of the pixel of interest to be a value of a pixel at the same location as the pixel of interest in a frame of the synthesized moving image before or after the interpolation frame without using the motion information corresponding to the pixel of interest in a case where the pixel of interest is determined to not be within the blending region while the corresponding pixel is determined to be within the blending region by the judgment unit.

4. The frame rate conversion apparatus according to claim 1, further comprising a frame memory that stores the synthesized moving image generated by the synthesizing unit.

* * * * *